United States Patent
Kim

(10) Patent No.: US 7,561,631 B2
(45) Date of Patent: Jul. 14, 2009

(54) MULTIPLE STREAMS USING PARTIAL STBC WITH SDM WITHIN A WIRELESS LOCAL AREA NETWORK

(75) Inventor: Joonsuk Kim, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 642 days.

(21) Appl. No.: 11/007,758

(22) Filed: Dec. 9, 2004

(65) Prior Publication Data

US 2006/0045199 A1    Mar. 2, 2006

Related U.S. Application Data

(60) Provisional application No. 60/604,050, filed on Aug. 25, 2004.

(51) Int. Cl.
*H04B 7/02* (2006.01)
*H04L 1/02* (2006.01)

(52) U.S. Cl. ............... 375/267; 375/299; 375/347; 375/260; 375/349

(58) Field of Classification Search ........... 375/267, 375/260, 299, 347, 346, 349; 370/208
See application file for complete search history.

(56) References Cited

U.S. PATENT DOCUMENTS

| | | | |
|---|---|---|---|
| 6,067,290 A * | 5/2000 | Paulraj et al. | 370/329 |
| 6,298,092 B1 * | 10/2001 | Heath et al. | 375/267 |
| 6,351,499 B1 * | 2/2002 | Paulraj et al. | 375/267 |
| 6,865,237 B1 | 3/2005 | Boariu et al. | |
| 7,010,053 B2 | 3/2006 | El-Gamal et al. | |
| 7,068,628 B2 | 6/2006 | Li et al. | |
| 7,257,167 B2 | 8/2007 | Lau | |
| 7,292,647 B1 | 11/2007 | Giannakis et al. | |
| 7,308,035 B2 | 12/2007 | Rouquette et al. | |
| 2005/0185575 A1 * | 8/2005 | Hansen et al. | 370/208 |
| 2007/0140370 A1 | 6/2007 | Helard et al. | |

FOREIGN PATENT DOCUMENTS

EP    1 073 294 A1    1/2001

OTHER PUBLICATIONS

"Bluetooth Will Co-Exist: Study," Matthew Peretz, see www.80211-planet.com/news/print/0..1481_913471.html, published Aug. 21, 2002.

(Continued)

*Primary Examiner*—Phuong Phu
(74) *Attorney, Agent, or Firm*—McAndrews, Held & Malloy, Ltd.

(57) ABSTRACT

A method of communicating data to M receiving antennas from N transmitting antennas, where M and N are integers, the method includes the steps of receiving M data signals from M receive antennas, applying the M data signals to a space/time decoder to produce M decoded streams and reconstructing original data transmitted via N transmit antennas from the M decoded streams. At least P transmitting antennas transmit space-time block-coded signals and (N-P) transmitting antennas transmit code signals through spatial division multiplexing, where P is an integer.

24 Claims, 7 Drawing Sheets

OTHER PUBLICATIONS

"Bluetooth and 802.11: A Tale of Two Technologies," see www.10meters.com/blue_802.html, published Aug. 21, 2002.

"Bluetooth and Wi-Fi: Friends or Foes?" see www.nwfusion.com/cgi-bin/mailto/x.cgi, published Aug. 21, 2002.

"Anatomy of IEEE 802.11b Wireless," see www.networkcomp;uting.com/shared/printArticle.jhtml?.../115ws2full.html, published Aug. 21, 2002.

"Report: IBM, Intel, cell companies eye national Wi-Fi net," see www.computerworld.com/mobiletopics/mobile/story/0,10801,72752,00.html, published Aug. 7, 2002.

"Vendors field new Wireless LAN Security Products," see www.computerworld.com/mobiletopics/mobile/technology/story/0,10801,72912,00.html, published Aug. 7, 2002.

"Microsoft Plans Foray Into Home WLAN Device Market," see www.computerworld.com/networkingtopics/networking/lanwan/story/0,10801,72890.html, published Aug. 7, 2002.

"Simple 802.11b Wireless Ethernet Network with an Access Point," see www.homenethelp.com/web/diagram/access-point.asp, published Aug. 20, 2002.

"How Wireless Networking Works," see www.howstuffworks.com/wireless-network.htm/printable.html, published Aug. 15, 2002.

"Bridging a Wireless 802.11b Network with a Wired Ethernet Network," see www.homenethelp.com/web/diagram/wireless-bridged.asp, published Aug. 20, 2002.

"Wireless Access Point (802.11b) of the Router Variety," see www.homenethelp.com/web/diagram/share-wireless-ap.asp, published Aug. 20, 2002.

"Ultrawideband May Thwart 802.11, Bluetooth Efforts," see www.currenti...?magazinearticle.asp?magazinearticleid=140454&magazineid=7$mode=prin, published Aug. 21, 2002.

"Brief Tutorial on IEEE 802.11 Wireless LANs," intersil™, Feb. 1999.

"Wireless Data Blaster," Scientific American.com, David G. Leeper, May 4, 2002.

"Increasing Data Rate Over Wireless Channels," Ayman F. Naguilo, et al., IEEE Signal Processing Magazine, May 2000.

"Efficient Adaptive Receivers for Joint Equalization and Interference Cancellation in Multiuser Space-Time-Block-Coded Systems," Waleed M. Younis, et al., IEEE Transactions of Signal Processing, vol. 51, No. 11, Nov. 2003.

"PAWNs: Satisfying the Need for Ubiquitous Secure Connectivity and Location Services," Paramvir Bahl, et al., IEEE Wireless Communications, Feb. 2002.

"WLAN-GPRS Integration for Next-Generation Mobile Data Networks," Apostolis K. Salkintzis, et al., IEEE Wireless Communications, Oct. 2002.

Lei Shao et al.; "A Rate-One Non-Orthogonal Space-Time Coded OFDM System with Estimation for Frequency Selective Channels"; Nov. 2002; IEEE; Global Telecommunications Conference; pp. 676-680.

* cited by examiner

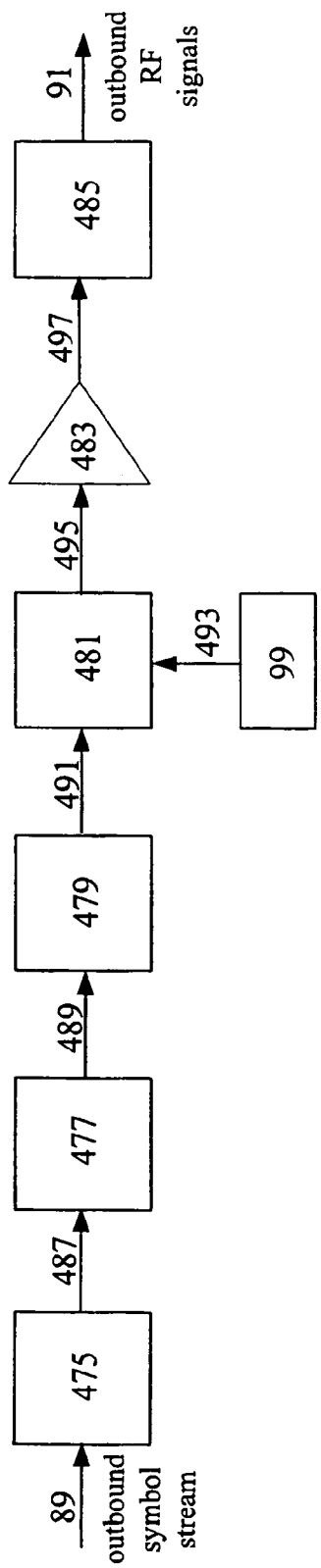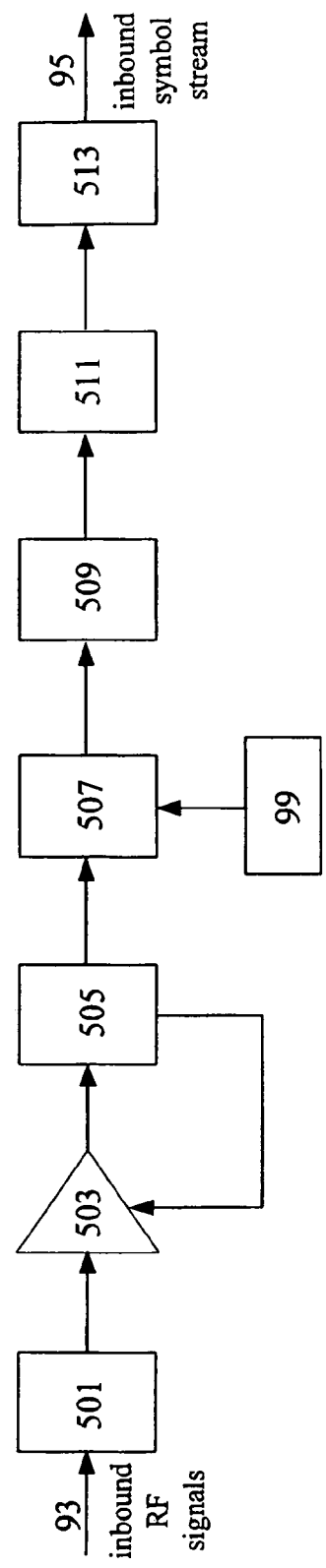
Fig. 2(a)
Fig. 2(b)

MULTIPLE STREAMS USING PARTIAL STBC WITH SDM WITHIN A WIRELESS LOCAL AREA NETWORK

REFERENCE TO RELATED APPLICATIONS

This application claims priority of U.S. Provisional Patent Application Ser. No. 60/604,050, filed Aug. 25, 2004. The subject matter of this earlier filed application is hereby incorporated by reference.

BACKGROUND OF THE INVENTION

1. Technical Field of the Invention

This invention relates generally to wireless communication systems and more particularly to a transmitter transmitting at high data rates with such wireless communication systems. Additionally, the present invention allows the detection and reception of multiple data streams for higher data rates.

2. Description of Related Art

Communication systems support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, BLUETOOTH™, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

For each wireless communication device to participate-in wireless communications, it may include a built-in radio transceiver (i.e., receiver and transmitter) or may be coupled to an associated radio transceiver (e.g., a station for in-home and/or in-building wireless communication networks, RF modem, etc.). The transmitter may include a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

The transmitter may include a data modulation stage, one or more intermediate frequency stages, and a power amplifier. The data modulation stage can convert raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

The transmitter includes at least one antenna for transmitting the RF signals, which are received by a single antenna, or multiple antennas, of a receiver. When the receiver includes two or more antennas, the receiver will select one of them to receive the incoming RF signals. In this instance, the wireless communication between the transmitter and receiver is a single-output-single-input (SOSI) communication, even if the receiver includes multiple antennas that are used as diversity antennas (i.e., selecting one of them to receive the incoming RF signals). For SISO wireless communications, a transceiver includes one transmitter and one receiver.

Other types of wireless communications include single-input-multiple-output (SIMO), multiple-input-single-output (MISO), and multiple-input-multiple-output (MIMO). In a SIMO wireless communication, a single transmitter processes data into radio frequency signals that are transmitted to a receiver. The receiver includes two or more antennas and two or more receiver paths. Each of the antennas receives the RF signals and provides them to a corresponding receiver path (e.g., LNA, down conversion module, filters, and ADCs). Each of the receiver paths processes the received RF signals to produce digital signals, which are combined and then processed to recapture the transmitted data.

For a multiple-input-single-output (MISO) wireless communication, the transmitter includes two or more transmission paths (e.g., digital to analog converter, filters, up-conversion module, and a power amplifier) that each converts a corresponding portion of baseband signals into RF signals, which are transmitted via corresponding antennas to a receiver. The receiver includes a single receiver path that receives the multiple RF signals from the transmitter. In this instance, the receiver uses beam forming to combine the multiple RF signals into one signal for processing.

For a multiple-input-multiple-output (MIMO) wireless communication, the transmitter and receiver each include multiple paths. In such a communication, the transmitter parallel processes data using a spatial and time encoding function to produce two or more streams of data. The transmitter includes multiple transmission paths to convert each stream of data into multiple RF signals. The receiver receives the multiple RF signals via multiple receiver paths that recapture the streams of data utilizing a spatial and time decoding function. The recaptured streams of data are combined and subsequently processed to recover the original data.

With the various types of wireless communications (e.g., SISO, MISO, SIMO, and MIMO), providing a diversity of transmitted signals is important to ensure proper data integrity. However, prior art systems do not have the ability to separate and detect signals from multiple streams and realize the full benefits of those multiple streams. Therefore, a need exists for a receiver that has the ability to detect and separate signals from multiple streams so that coding and diversity gain may be realized.

BRIEF SUMMARY OF THE INVENTION

According to one embodiment of the present invention, a method of communicating data to M receiving antennas from N transmitting antennas, where M and N are integers, the method includes the steps of receiving M data signals from M receive antennas, applying the M data signals to a space/time decoder to produce M decoded streams and reconstructing original data transmitted via N transmit antennas from the M decoded streams. At least P transmitting antennas transmit space-time block-coded signals and (N-P) transmitting antennas transmit code signals through spatial division multiplexing, where P is an integer.

Additionally, the step of reconstructing original data may include determining a number of transmit streams and configurations of those transmit streams through analysis of the M decoded streams. Also, P may be two and the step of receiving M data signals includes receiving two space-time block-coded signals. Also, when N is three, the step of receiving M data signals includes receiving a repetition code signal. Additionally, the step of reconstructing original data may include zero-forcing terms equivalent to relationships between signals sent from the N transmitting antennas to the M receiving antennas to cancel interference.

According to another embodiment, a receiver for communicating data from N transmitting antennas to M receiving antennas, where M and N are integers, includes receiving means for receiving M data signals via M receive antennas, applying means for applying the M data signals to a space/time decoder to produce M decoded streams and reconstructing means for reconstructing original data transmitted via N transmit antennas from the M decoded streams. At least P transmitting antennas transmit space-time block-coded signals and (N-P) transmitting antennas transmit code signals through spatial division multiplexing, where P is an integer.

According to another embodiment, a receiver for communicating data from N transmitting antennas to M receiving antennas, where M and N are integers includes M receive antennas, for receiving M data signals, a space/time decoder, configured to produce M decoded streams based on the M data signals and symbol demapping modules, configured to reconstruct original data transmitted via N transmit antennas from the M decoded streams. At least P transmitting antennas transmit space-time block-coded signals and (N-P) transmitting antennas transmit code signals through spatial division multiplexing, where P is an integer.

BRIEF DESCRIPTION OF THE DRAWINGS

For the present invention to be easily understood and readily practiced, the present invention will now be described, for purposes of illustration and not limitation, in conjunction with the following figures:

FIG. 2 illustrates schematic block diagrams of a transmitter and receiver, with FIG. 2(a) providing a schematic block diagram of an RF transmitter and with FIG. 2(b) providing a schematic block diagram of an RF receiver, in accordance with embodiments of the present invention;

DETAILED DESCRIPTION OF THE PREFERRED EMBODIMENTS

Figure 1:
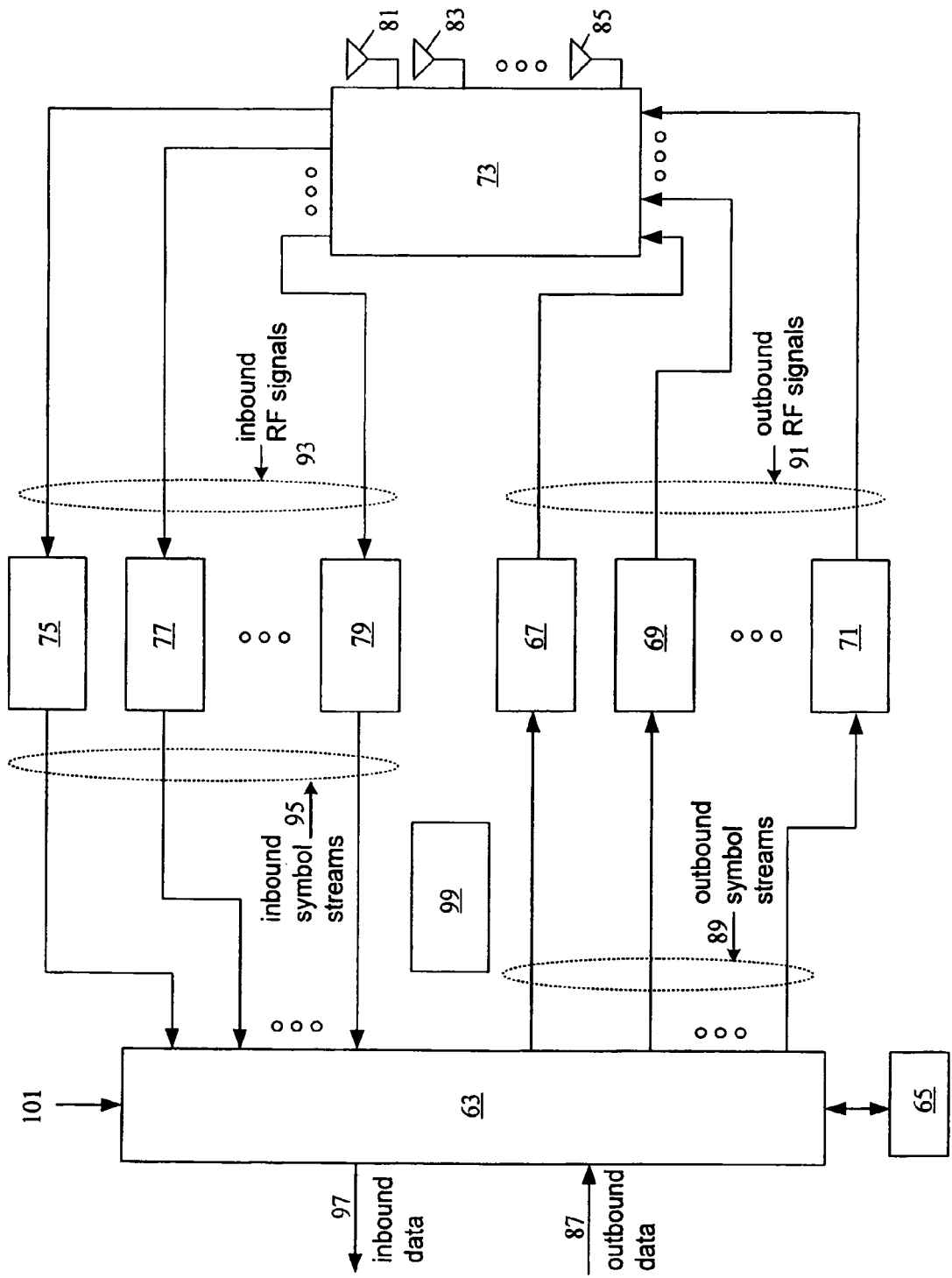
FIG. 1 is a schematic block diagram of a wireless communication device in accordance with one embodiment of the present invention.

FIG. 1 is a schematic block diagram illustrating a wireless communication device, according to an example of the invention. The device includes a baseband processing module 63, memory 65, a plurality of radio frequency (RF) transmitters 67, 69, 71, a transmit/receive (T/R) module 73, a plurality of antennas 81, 83, 85, a plurality of RF receivers 75, 77, 79, and a local oscillation module 99. The baseband processing module 63, in combination with operational instructions stored in memory 65, execute digital receiver functions and digital transmitter functions, respectively. The digital receiver functions include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions include, but are not limited to, scrambling, encoding, interleaving, constellation mapping, modulation, inverse fast Fourier transform, cyclic prefix addition, space and time encoding, and/or digital baseband to IF conversion. The baseband processing module 63 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 66 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 63 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the baseband processing module 63 receives the outbound data 87 and, based on a mode selection signal 101, produces one or more outbound symbol streams 89. The mode selection signal 101 will indicate a particular mode as are indicated in mode selection tables. For example, the mode selection signal 101 may indicate a frequency band of 2.4 GHz, a channel bandwidth of 20 or 22 MHz and a maximum bit rate of 54 megabits-per-second. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. A code rate is supplied as well as number of coded bits per subcarrier (NBPSC), coded bits per OFDM symbol (NCBPS), data bits per OFDM symbol (NDBPS), error vector magnitude in decibels (EVM), sensitivity which indicates the maximum receive power required to obtain a target packet error rate (e.g., 10% for IEEE 802.11a), adjacent channel rejection (ACR), and an alternate adjacent channel rejection (AACR).

The mode selection signal may also indicate a particular channelization for the corresponding mode. The mode select signal may further indicate a power spectral density mask value. The mode select signal may alternatively indicate a rate that has a 5 GHz frequency band, 20 MHz channel bandwidth and a maximum bit rate of 54 megabits-per-second. As a further alternative, the mode select signal 101 may indicate a 2.4 GHz frequency band, 20 MHz channels and a maximum bit rate of 192 megabits-per-second. A number of antennas may be utilized to achieve the higher bandwidths. In this instance, the mode select would further indicate the number of antennas to be utilized. Another mode option may be utilized where the frequency band is 2.4 GHz, the channel bandwidth is 20 MHz and the maximum bit rate is 192 megabits-per-second. Various bit rates ranging from 12 megabitsper-second to 216 megabits-per-second utilizing 2-4 antennas and a spatial time encoding rate may be employed. The mode select signal 101 may further indicate a particular operating mode, which corresponds to a 5 GHz frequency band having 40 MHz frequency band having 40 MHz channels and a maximum bit rate of 486 megabits-per-second. The bit rate may range, in this example, from 13.5 megabits-per-second to 486 megabits-per-second utilizing 1-4 antennas and a corresponding spatial time code rate.

The baseband processing module 63, based on the mode selection signal 101 produces the one or more outbound symbol streams 89 from the output data 88. For example, if the mode selection signal 101 indicates that a single transmit antenna is being utilized for the particular mode that has been selected, the baseband processing module 63 will produce a single outbound symbol stream 89. Alternatively, if the mode select signal indicates 2, 3 or 4 antennas, the baseband processing module 63 will produce 2, 3 or 4 outbound symbol streams 89 corresponding to the number of antennas from the output data 88.

Depending on the number of outbound streams 89 produced by the baseband module 63, a corresponding number of the RF transmitters 67, 69, 71 can be enabled to convert the outbound symbol streams 89 into outbound RF signals 91. The implementation of the RF transmitters 67, 69, 71 will be further described with reference to FIG. 2. The transmit/receive module 73 receives the outbound RF signals 91 and provides each outbound RF signal to a corresponding antenna 81, 83, 85.

When the radio 60 is in the receive mode, the transmit/receive module 73 receives one or more inbound RF signals via the antennas 81, 83, 85. The T/R module 73 provides the inbound RF signals 93 to one or more RF receivers 75, 77, 79. The RF receiver 75, 77, 79, which will be described in greater detail with reference to FIG. 4, converts the inbound RF signals 93 into a corresponding number of inbound symbol streams 96. The number of inbound symbol streams 95 will correspond to the particular mode in which the data was received. The baseband processing module 63 receives the inbound symbol streams 89 and converts them into inbound data 97.

As one of average skill in the art will appreciate, the wireless communication device of FIG. 1 may be implemented using one or more integrated circuits. For example, the device may be implemented on one integrated circuit, the baseband processing module 63 and memory 65 may be implemented on a second integrated circuit, and the remaining components, less the antennas 81, 83, 85, may be implemented on a third integrated circuit. As an alternate example, the device may be implemented on a single integrated circuit.

FIG. 2(a) is a schematic block diagram of an embodiment of an RF transmitter 67, 69, 71. The RF transmitter may include a digital filter and up-sampling module 475, a digital-to-analog conversion module 477, an analog filter 479, and up-conversion module 81, a power amplifier 483 and a RF filter 485. The digital filter and up-sampling module 475 receives one of the outbound symbol streams 89 and digitally filters it and then up-samples the rate of the symbol streams to a desired rate to produce the filtered symbol streams 487. The digital-to-analog conversion module 477 converts the filtered symbols 487 into analog signals 489. The analog signals may include an in-phase component and a quadrature component.

The analog filter 479 filters the analog signals 489 to produce filtered analog signals 491. The up-conversion module 481, which may include a pair of mixers and a filter, mixes the filtered analog signals 491 with a local oscillation 493, which is produced by local oscillation module 99, to produce high frequency signals 495. The frequency of the high frequency signals 495 corresponds to the frequency of the RF signals 492.

The power amplifier 483 amplifies the high frequency signals 495 to produce amplified high frequency signals 497. The RF filter 485, which may be a high frequency band-pass filter, filters the amplified high frequency signals 497 to produce the desired output RF signals 91.

As one of average skill in the art will appreciate, each of the radio frequency transmitters 67, 69, 71 will include a similar architecture as illustrated in FIG. 2(a) and further include a shut-down mechanism such that when the particular radio frequency transmitter is not required, it is disabled in such a manner that it does not produce interfering signals and/or noise.

FIG. 2(b) is a schematic block diagram of each of the RF receivers 75, 77, 79. In this embodiment, each of the RF receivers may include an RF filter 501, a low noise amplifier (LNA) 503, a programmable gain amplifier (PGA) 505, a down-conversion module 507, an analog filter 509, an analog-to-digital conversion module 511 and a digital filter and down-sampling module 513. The RF filter 501, which may be a high frequency band-pass filter, receives the inbound RF signals 93 and filters them to produce filtered inbound RF signals. The low noise amplifier 503 amplifies the filtered inbound RF signals 93 based on a gain setting and provides the amplified signals to the programmable gain amplifier 505. The programmable gain amplifier further amplifies the inbound RF signals 93 before providing them to the down-conversion module 507.

The down-conversion module 507 includes a pair of mixers, a summation module, and a filter to mix the inbound RF signals with a local oscillation (LO) that is provided by the local oscillation module to produce analog baseband signals. The analog filter 509 filters the analog baseband signals and provides them to the analog-to-digital conversion module 511 which converts them into a digital signal. The digital filter and down-sampling module 513 filters the digital signals and then adjusts the sampling rate to produce the inbound symbol stream 95.

Figure 3A:
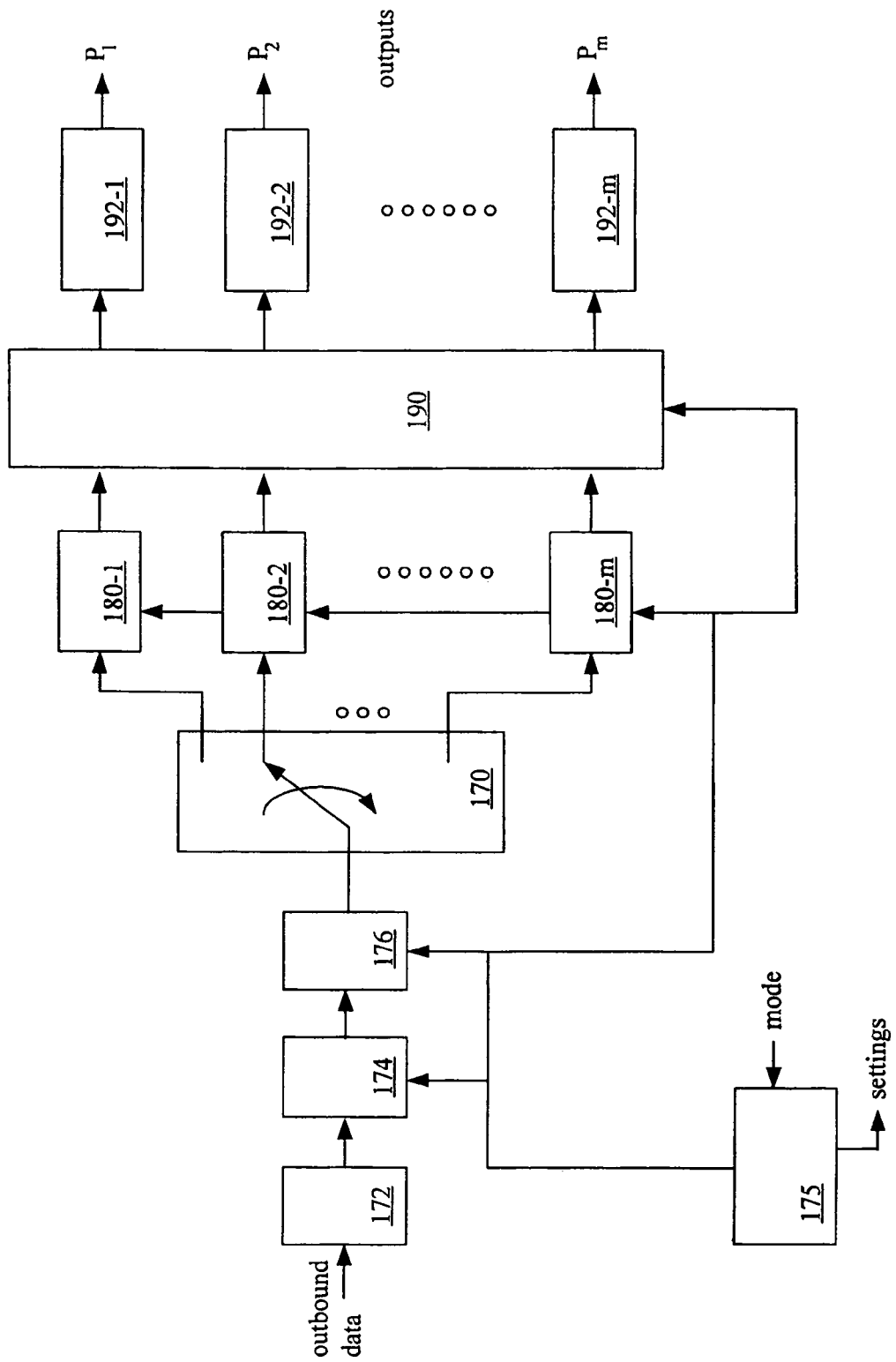
FIGS. 3(a) and 3(b) are a schematic block diagram of a transmitter in accordance one embodiment of with the present invention.
Figure 3B:
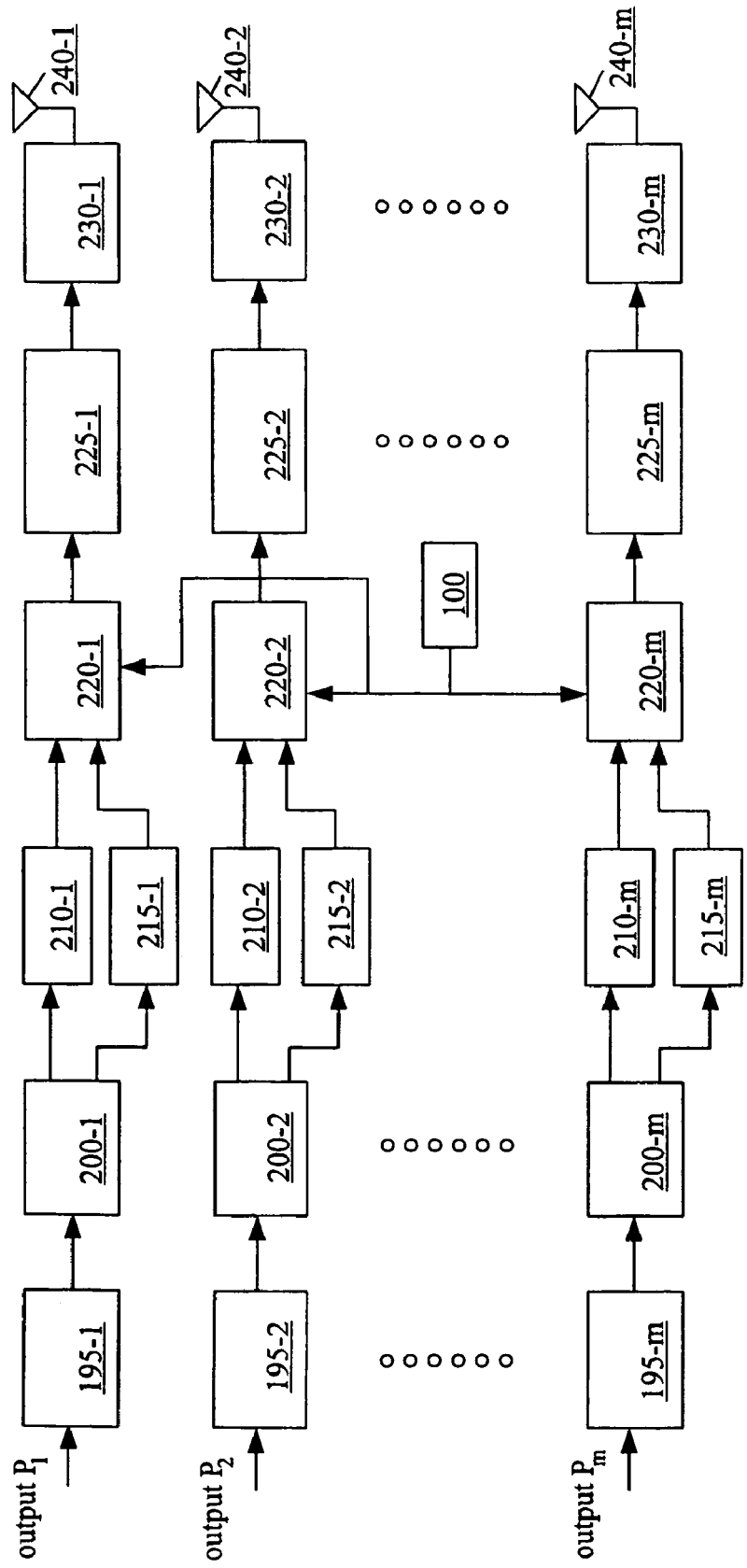

FIGS. 3(a) and 3(b) illustrate a schematic block diagram of a multiple transmitter in accordance with the present invention. In FIG. 3(a), the baseband processing is shown to include a scrambler 172, channel encoder 174, interleaver 176, demultiplexer 170, a plurality of symbol mappers 180-1 through 180-$m$, a space/time encoder 190 and a plurality of inverse fast Fourier transform (IFFT)/cyclic prefix addition modules 192-1 through 192-$m$. The baseband portion of the transmitter may further include a mode manager module 175 that receives the mode selection signal and produces settings for the radio transmitter portion and produces the rate selection for the baseband portion.

In operations, the scrambler 172 adds (in GF2) a pseudo random sequence to the outbound data bits 88 to make the data appear random. A pseudo random sequence may be generated from a feedback shift register with the generator polynomial, for example, of $S(x)=x^7+x^4+1$ to produce scrambled data. The channel encoder 174 receives the scrambled data and generates a new sequence of bits with redundancy. This will enable improved detection at the receiver. The channel encoder 174 may operate in one of a plurality of modes. For example, for backward compatibility with standards such as IEEE 802.11(a) and IEEE 802.11(g), the channel encoder has the form of a rate ½ convolutional encoder with 64 states and a generator polynomials of $G_0=133_8$ and $G_1=171_8$. The output of the convolutional encoder may be punctured to rates of ½, ⅔rds and ¾ according to the specified rate tables. For backward compatibility with IEEE 802.11(b) and the CCK modes of IEEE 802.11(g), the channel encoder has the form of a CCK code as defined in IEEE 802.11(b). For higher data rates, the channel encoder may use the same convolution encoding as described above or it may use a more powerful code, including a convolutional code with more states, a parallel concatenated (turbo) code and/or a low density parity check (LDPC) block code. Further, any one of these codes may be combined with an outer Reed Solomon code. Based on a balancing of performance, backward compatibility and low latency, one or more of these codes may be optimal.

The interleaver 176 receives the encoded data and spreads it over multiple symbols and transmit streams. This allows improved detection and error correction capabilities at the receiver. In one embodiment, the interleaver 176 will follow the IEEE 802.11(a) or (g) standard in the backward compatible modes. For higher performance modes, the interleaver will interleave data over multiple transmit streams. The demultiplexer 170 converts the serial interleave stream from interleaver 176 into M-parallel streams for transmission.

Each symbol mapper 180-m through 180-m receives a corresponding one of the M-parallel paths of data from the demultiplexer. Each symbol mapper locks maps bit streams to quadrature amplitude modulated QAM symbols (e.g., BPSK, QPSK, 16 QAM, 64 QAM, 256 QAM, et cetera) according to the rate tables. For IEEE 802.11(a) backward compatibility, double gray coding may be used.

The map symbols produced by each of the symbol mappers 180 are provided to the space/time encoder 190. Thereafter, output symbols are provided to the IFFT/cyclic prefix addition modules 192-1 through 192-m, which performs frequency domain to time domain conversions and adds a prefix, which allows removal of inter-symbol interference at the receiver. In general, a 64-point IFFT will be used for 20 MHz channels and 128-point IFFT will be used for 40 MHz channels.

In one embodiment, the number of M-input paths will equal the number of P-output paths. In another embodiment, the number of output paths P will equal M+1 paths. For each of the paths, the space/time encoder multiples the input symbols with an encoding matrix that has the form of:

$$\begin{bmatrix} C_1 & C_2 & C_3 & \ldots & C_{2M} \\ -C_2^* & C_1^* & -C_4^* & \ldots & C_{(2M-1)}^* \end{bmatrix}$$

Note that the rows of the encoding matrix correspond to the number of input paths and the columns correspond to the number of output paths.

FIG. 3(b) illustrates the radio portion of the transmitter that includes a plurality of digital filter/up-sampling modules 195-1 through 195-m, digital-to-analog conversion modules 200-1 through 200-m, analog filters 210-1 through 210-m and 215-1 through 215-m, I/Q modulators 220-1 through 220-m, RF amplifiers 225-1 through 225-m, RF filters 230-1 through 230-m and antennas 240-1 through 240-m. The P-outputs from the other stage are received by respective digital filtering/up-sampling modules 195-1 through 195-m.

In operation, the number of radio paths that are active correspond to the number of P-outputs. For example, if only one P-output path is generated, only one of the radio transmitter paths will be active. As one of average skill in the art will appreciate, the number of output paths may range from one to any desired number.

The digital filtering/up-sampling modules 195-1 through 195-m filter the corresponding symbols and adjust the sampling rates to correspond with the desired sampling rates of the digital-to-analog conversion modules 200. The digital-to-analog conversion modules 200 convert the digital filtered and up-sampled signals into corresponding in-phase and quadrature analog signals. The analog filters 210 and 215 filter the corresponding in-phase and/or quadrature components of the analog signals, and provide the filtered signals to the corresponding I/Q modulators 220. The I/Q modulators 220 based on a local oscillation, which is produced by a local oscillator 100, up-converts the I/Q signals into radio frequency signals. The RF amplifiers 225 amplify the RF signals which are then subsequently filtered via RF filters 230 before being transmitted via antennas 240.

Figure 4A:
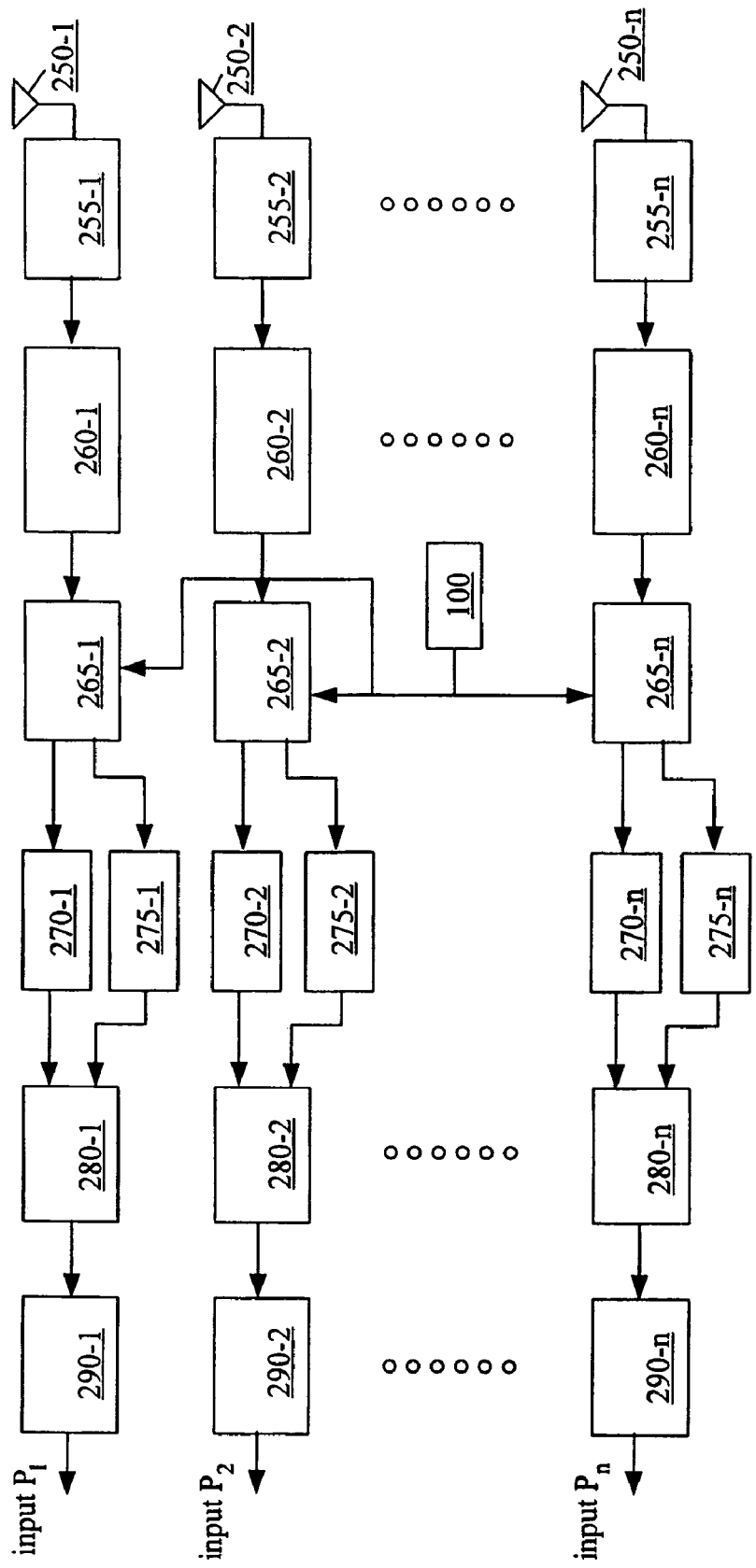
FIGS. 4(a) and 4(b) are a schematic block diagram of a receiver in accordance with one embodiment of the present invention.
Figure 4B:
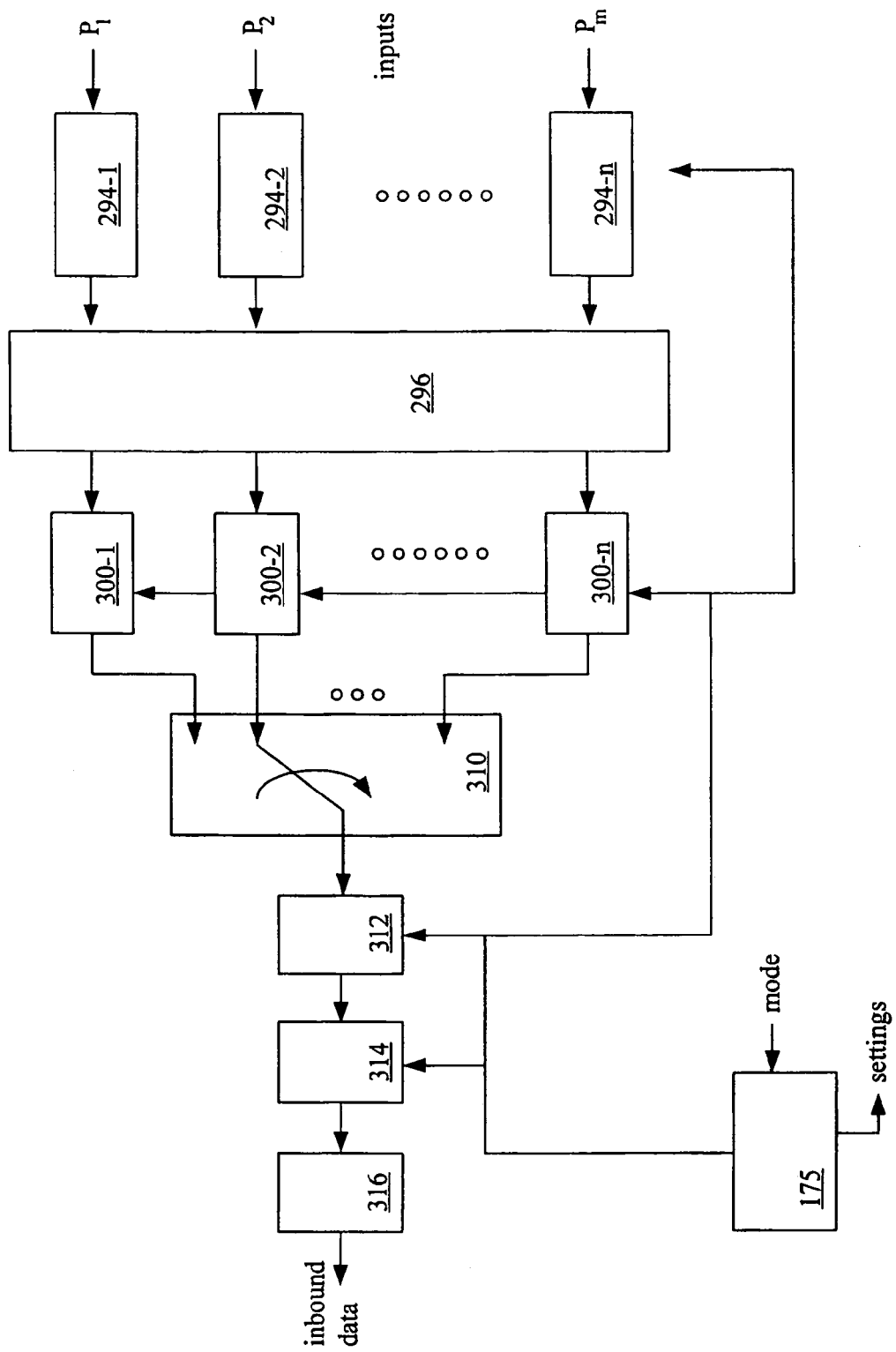

FIGS. 4(a) and 4(b) illustrate a schematic block diagram of another embodiment of a receiver in accordance with the present invention. FIG. 4(a) illustrates the analog portion of the receiver which includes a plurality of receiver paths. Each receiver path includes an antenna 250-1 through 250-n, RF filters 255-1 through 255-n, low noise amplifiers 260-1 through 260-n, I/O demodulators 265-1 through 265-n, analog filters 270-1 through 270-n and 275-1 through 275-n, analog-to-digital converters 280-1 through 280-n and digital filters and down-sampling modules 290-1 through 290-n.

In operation, the antennas 250 receive inbound RF signals, which are band-pass filtered via the RF filters 255. The corresponding low noise amplifiers 260 amplify the filtered signals and provide them to the corresponding I/Q demodulators 265. The I/Q demodulators 265, based on a local oscillation, which is produced by local oscillator 100, down-converts the RF signals into baseband in-phase and quadrature analog signals.

The corresponding analog filters 270 and 275 filter the in-phase and quadrature analog components, respectively. The analog-to-digital converters 280 convert the in-phase and quadrature analog signals into a digital signal. The digital filtering and down-sampling modules 290 filter the digital signals and adjust the sampling rate to correspond to the rate of the baseband processing, which will be described in FIG. 4(b).

FIG. 4(b) illustrates the baseband processing of a receiver. The baseband processing portion includes a plurality of fast Fourier transform (FFT)/cyclic prefix removal modules 294-1 through 294-n, a space/time decoder 296, a plurality of symbol demapping modules 300-1 through 300-n, a multiplexer 310, a deinterleaver 312, a channel decoder 314, and a descramble module 316. The baseband processing module may further include a mode managing module 175. The receiver paths are processed via the FFT/cyclic prefix removal modules 294 which perform the inverse function of the IFFT/cyclic prefix addition modules 192 to produce frequency domain symbols as M-output paths. The space/time decoding module 296, which performs the inverse function of space/time encoder 190, receives the M-output paths.

The symbol demapping modules 300 convert the frequency domain symbols into data utilizing an inverse process of the symbol mappers 180. The multiplexer 310 combines the demapped symbol streams into a single path.

The deinterleaver 312 deinterleaves the single path utilizing an inverse function of the function performed by interleaver 176. The deinterleaved data is then provided to the channel decoder 314 which performs the inverse function of channel encoder 174. The descrambler 316 receives the decoded data and performs the inverse function of scrambler 172 to produce the inbound data 98.

As noted above, STBC is usually performed with pairs of antennas, utilizing Orthogonal Frequency Division Multiplexing (OFDM). With multiple antennas, i.e. with more than two antennas, multiple streams can be utilized to achieve higher data rates. In such cases, STBC is applied over some of the transmit antennas, but other antennas transmit signals without STBC. These other antennas may transmit using Spatial Division Multiplexing (SDM). Thus, portions of the signal streams have diversity gains, while others do not. In this way, it is also possible to have greater coding gains from better signal streams. Given these additional possibilities, a receiver according to the present invention should have the ability to detect and separate signals to achieve these gains.

Figure 5:
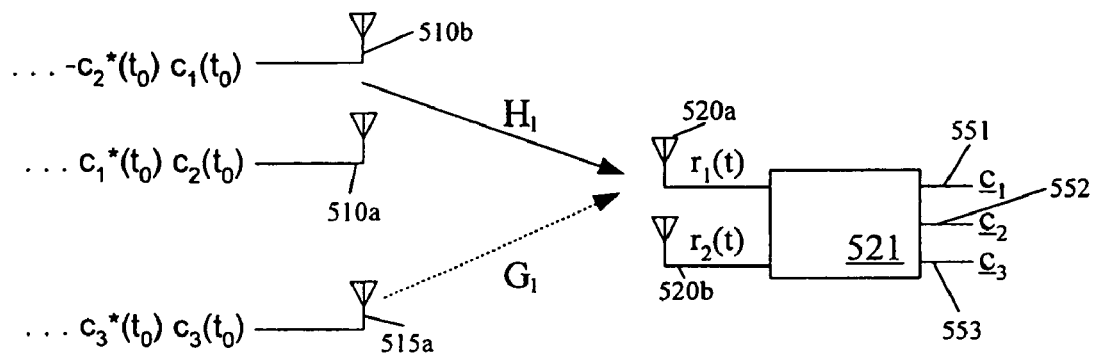
FIG. 5 is a diagram illustrating a Space-Time Block Coding (STBC) method with three transmit antennas to achieve one and a half streams, in accordance with one embodiment of the present invention.

FIG. 5 is a basic diagram illustrating one embodiment of STBC realization or transmission with SDM by the receiver 521. Multiple signals, $c_1(t)$, $c_2(t)$ and $c_3(t)$, are received from an encoding block. The $t_i$ denotes an encoding interval index in time, usually a two symbol period for the STBC encoder. After coding, $c_1$ and $c_2$ are transmitted through transmission antennas 510a and 510b, and signal $C_3$ is transmitted through transmission antenna 515a. The signals $c_1$ and $c_2$ can be configured with conjugate values and signal $C_3$ is encoded by repetition coding. The transmitted signals are received by the STBC decoding block 521, through receive antennas 520a and 520b. After processing, signals, $c_1$, $c_2$, and $c_3$, based on the originally transmitted signals are reformulated and output through outputs 551, 552 and 553. In general, the received signals are related to the source signals through an "H" or "G" component plus a noise term.

From this set-up, the channels may be estimated as:

$$\begin{bmatrix} r_1 \\ r_2 \end{bmatrix}_{4\times 1} = \begin{bmatrix} H_1 & G_1 \\ H_2 & G_2 \end{bmatrix}_{4\times 3} \begin{bmatrix} c_1 \\ c_2 \end{bmatrix}_{3\times 1} + \begin{bmatrix} n_1 \\ n_2 \end{bmatrix}_{4\times 1} \quad \text{where,} \quad (1)$$

$$c_1 = \begin{bmatrix} c_1(t_0) \\ c_2(t_0) \end{bmatrix}, c_2 = [c_3(t_0)], r_1 = \begin{bmatrix} r_1(t_0) \\ r_1^*(t_1) \end{bmatrix}, r_2 = \begin{bmatrix} r_2(t_0) \\ r_2^*(t_1) \end{bmatrix},$$

$$H_i = \begin{bmatrix} h_{1i} & h_{2i} \\ h_{2i}^* & -h_{1i}^* \end{bmatrix}, G_i = \begin{bmatrix} g_i \\ g_i^* \end{bmatrix}$$

To cancel the interference, zero forcing is applied such that:

$$\begin{bmatrix} \begin{bmatrix} 1 & 0 \\ 0 & 1 \end{bmatrix} & \begin{bmatrix} -g_1 g_2^{-1} & 0 \\ 0 & -g_1^* g_2^{-1*} \end{bmatrix} \\ z_1 \; z_2 & z_3 \; z_4 \end{bmatrix}_{3\times 4} \times \quad (2)$$

$$\begin{bmatrix} r_1 \\ r_2 \end{bmatrix} = \begin{bmatrix} \tilde{r}_1 \\ \tilde{r}_2 \end{bmatrix} = \begin{bmatrix} \tilde{H} & 0 \\ 0 & \tilde{G} \end{bmatrix}_{3\times 3} \times \begin{bmatrix} c_1 \\ c_2 \end{bmatrix} + \begin{bmatrix} \tilde{n}_1 \\ \tilde{n}_2 \end{bmatrix}$$

where, $\tilde{H}_{2\times 2} = H_1 - \begin{bmatrix} -g_1 g_2^{-1} & 0 \\ 0 & -g_1^* g_2^{-1*} \end{bmatrix} \times H_2$, $$\tilde{G}_{1\times 1} = \sqrt{|g_1|^2 + |g_2|^2},$$

and $z_1$, $z_2$, $z_3$ and $z_4$ satisfy the following equation:

$$h_{11}z_1 + h^*_{21}z_2 + h_{12}z_3 + h^*_{22}z_4 = 0$$

$$h_{21}z_1 - h^*_{11}z_2 + h_{22}z_3 - h^*_{12}z_4 = 0$$

$$g_1 z_1 + g^*_1 z_2 + g_2 z_3 + g^*_2 z_4 = \sqrt{|g_1|^2 + |g_2|^2} \quad (3)$$

Thereafter Z is found by zero-forcing to minimize noise enhancement, such that:

$$z = (AA^*)^{-1} A^* c \quad (4)$$

$$\text{where,} \; z = [z_1 \; z_2 \; z_3 \; z_4]', A = \begin{bmatrix} h_{11} & h^*_{21} & h_{12} & h^*_{22} \\ h_{21} & -h^*_{11} & h_{22} & -h^*_{12} \\ g_1 & g^*_1 & g_2 & g^*_2 \end{bmatrix},$$

$$c = \begin{bmatrix} 0 & 0 & \sqrt{|g_1|^2 + |g_2|^2} \end{bmatrix}'.$$

Next, STBC decoding may be performed with channel matching such that $$\begin{bmatrix} \tilde{H}^* & 0 \\ & 0 \\ 0 & 0 & \tilde{G}^* \end{bmatrix} \begin{bmatrix} \tilde{r}_1 \\ \tilde{r}_2 \end{bmatrix} = \begin{bmatrix} \tilde{H}^* \tilde{H} & 0 \\ & 0 \\ 0 & 0 & \tilde{G}^* \tilde{G} \end{bmatrix} \begin{bmatrix} c_1 \\ c_2 \end{bmatrix} + \begin{bmatrix} N_1 \\ N_2 \end{bmatrix} \quad (5)$$

$$\tilde{H}^* \tilde{H} = \left( H_1 - \begin{bmatrix} -g_1 g_2^{-1} & 0 \\ 0 & -g_1^* g_2^{-1*} \end{bmatrix} \times H_2 \right)^*$$

$$\left( H_1 - \begin{bmatrix} -g_1 g_2^{-1} & 0 \\ 0 & -g_1^* g_2^{-1*} \end{bmatrix} \times H_2 \right),$$

where, $$\tilde{G}^* \tilde{G} = |g_1|^2 + |g_2|^2,$$

which is diagonalized and constant x identity.

Figure 6:
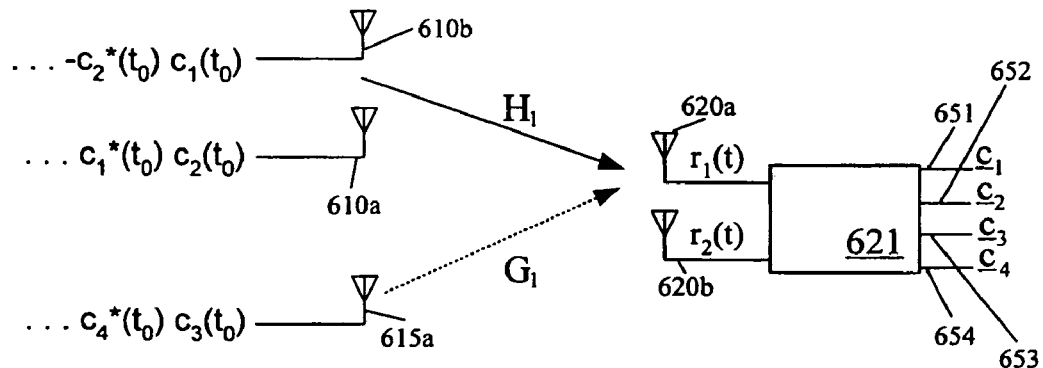
FIG. 6 is a diagram illustrating another STBC method with a Spatial Division Multiplexing (SDM) component, with three transmit antennas to achieve two streams, in accordance with one embodiment of the present invention.

FIG. 6 is a basic diagram illustrating another embodiment of STBC realization or transmission with SDM by the receiver 621. Multiple signals, $c_1(t)$, $c_2(t)$, $c_3(t)$ and $c_4(t)$, are received from an encoding block. After coding, $c_1$ and $c_2$ are transmitted through transmission antennas 610a and 610b, and signals $c_3$ and $c_4$ are transmitted through transmission antenna 615a. The signals $c_1$ and $c_2$ can be configured with conjugate values and signals $c_3$ and $C_4$ are being transmitted as in SDM with conjugate. The transmitted signals are received by the STBC decoding block 621, through receive antennas 620a and 620b. After processing, signals, $c_1$, $c_2$, $c_3$ and $c_4$, based on the originally transmitted signals are reformulated and output through outputs 651-654. In general, the received signals are related to the source signals through an "H" or "G" component plus a noise term.

From this set-up, the channels may be estimated as:

$$\begin{bmatrix} r_1 \\ r_2 \end{bmatrix}_{4\times 1} = \begin{bmatrix} H_1 & G_1 \\ H_2 & G_2 \end{bmatrix}_{4\times 4} \begin{bmatrix} c_1 \\ c_2 \end{bmatrix}_{4\times 1} + \begin{bmatrix} n_1 \\ n_2 \end{bmatrix}_{4\times 1} \quad \text{where,} \quad (6)$$

$$c_1 = \begin{bmatrix} c_1(t_0) \\ c_2(t_0) \end{bmatrix}, c_2 = \begin{bmatrix} c_3(t_0) \\ c_4(t_0) \end{bmatrix}, r_1 = \begin{bmatrix} r_1(t_0) \\ r_1^*(t_1) \end{bmatrix}, r_2 = \begin{bmatrix} r_2(t_0) \\ r_2^*(t_1) \end{bmatrix},$$

$$H_i = \begin{bmatrix} h_{1i} & h_{2i} \\ h_{2i}^* & -h_{1i}^* \end{bmatrix}, G_i = \begin{bmatrix} g_i & 0 \\ 0 & g_i^* \end{bmatrix}$$

To cancel the interference, zero forcing is applied such that:

$$\begin{bmatrix} \begin{bmatrix} 1 & 0 \\ 0 & 1 \end{bmatrix} & \begin{bmatrix} -g_1 g_2^{-1} & 0 \\ 0 & -g_1^* g_2^{-1*} \end{bmatrix} \\ z_{11} \; z_{12} & z_{13} \; z_{14} \\ z_{21} \; z_{22} & z_{23} \; z_{24} \end{bmatrix} \times \quad (7)$$

-continued $$\begin{bmatrix} r_1 \\ r_2 \end{bmatrix} = \begin{bmatrix} \tilde{r}_1 \\ \tilde{r}_2 \end{bmatrix} = \begin{bmatrix} \tilde{H} & 0 \\ 0 & \tilde{G} \end{bmatrix}_{4\times 4} \times \begin{bmatrix} c_1 \\ c_2 \end{bmatrix} + \begin{bmatrix} \tilde{n}_1 \\ \tilde{n}_2 \end{bmatrix}$$

where, $\tilde{H}_{2\times 2} = H_1 - \begin{bmatrix} -g_1 g_2^{-1} & 0 \\ 0 & -g_1^* g_2^{-1*} \end{bmatrix} \times H_2$, $$\tilde{G}_{2\times 2} = \sqrt{|g_1|^2 + |g_2|^2} \times \begin{bmatrix} 1 & 0 \\ 0 & 1 \end{bmatrix},$$

and $z_{ij}$ satisfy the following equation:

$h_{i1}z_{i1} + h^*_{21}z_{i2} + h_{12}z_{i3} + h^*_{22}z_{i4} = 0$ $h_{21}z_{i1} - h^*_{11}z_{i2} + h_{22}z_{i3} - h^*_{12}z_{i4} = 0$ $g_1 z_{11} + g_2 z_{13} = \sqrt{|g_1|^2 + |g_2|^2}$ $g^*_1 z_{22} + g^*_2 z_{24} = \sqrt{|g_1|^2 + |g_2|^2}$ (8)

with i being 1 or 2 in the above series of equations.

Thereafter Z is found by zero-forcing to minimize noise enhancement, such that:

$z = (AA^*)^{-1} A^* c$ (9)

$$z = \begin{bmatrix} z_{11} & z_{12} & z_{13} & z_{14} \\ z_{21} & z_{22} & z_{23} & z_{24} \end{bmatrix}', A = \begin{bmatrix} h_{11} & h^*_{21} & h_{12} & h^*_{22} \\ h_{21} & -h^*_{11} & h_{22} & -h^*_{12} \\ g_1 & 0 & g_2 & 0 \\ 0 & g^*_1 & 0 & g^*_2 \end{bmatrix},$$

where, $$c = \begin{bmatrix} 0 & 0 & \sqrt{|g_1|^2 + |g_2|^2} & 0 \\ 0 & 0 & 0 & \sqrt{|g_1|^2 + |g_2|^2} \end{bmatrix}'.$$

Next, STBC decoding may be performed with channel matching such that $$\begin{bmatrix} \tilde{H}^* & 0 \\ 0 & \tilde{G}^* \end{bmatrix} \begin{bmatrix} \tilde{r}_1 \\ \tilde{r}_2 \end{bmatrix} = \begin{bmatrix} \tilde{H}^* \tilde{H} & 0 \\ 0 & \tilde{G}^* \tilde{G} \end{bmatrix} \begin{bmatrix} c_1 \\ c_2 \end{bmatrix} + \begin{bmatrix} N_1 \\ N_2 \end{bmatrix}$$ (10)

$$\tilde{H}^* \tilde{H} = \left( H_1 - \begin{bmatrix} -g_1 g_2^{-1} & 0 \\ 0 & -g_1^* g_2^{-1*} \end{bmatrix} \times H_2 \right)^*$$

$$\left( H_1 - \begin{bmatrix} -g_1 g_2^{-1} & 0 \\ 0 & -g_1^* g_2^{-1*} \end{bmatrix} \times H_2 \right),$$

where, $$\tilde{G}^* \tilde{G} = (|g_1|^2 + |g_2|^2) \times \begin{bmatrix} 1 & 0 \\ 0 & 1 \end{bmatrix}$$

which is diagonalized and constant x identity.

Figure 7:
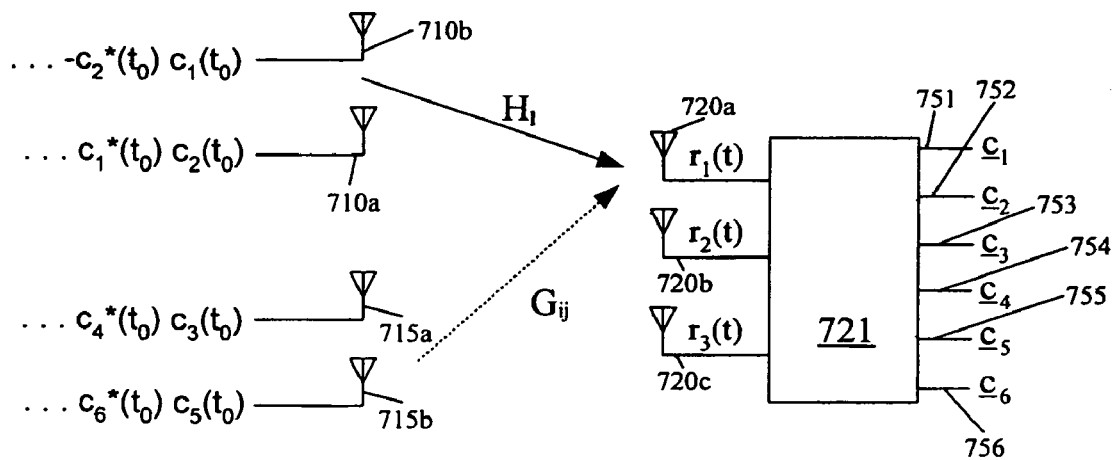
FIG. 7 is a diagram illustrating another STBC method with SDM components, with four transmit antennas to achieve three streams, in accordance with one embodiment of the present invention.

FIG. 7 is a basic diagram illustrating another embodiment of STBC realization or transmission with SDM by the receiver 721. Multiple signals, $c_1(t)$, $c_2(t)$, $c_3(t)$, $c_4(t)$, $c_5(t)$ and $c_6(t)$, are received from an encoding block. After coding, $c_1$ and $c_2$ are transmitted through transmission antennas 710a and 710b, and signals $c_3$, $c_4$, $c_5$ and $c_6$ are transmitted through transmission antennas 715a and 715b. The signals $c_1$ and $c_2$ can be configured with conjugate values and signals $c_3$, $c_4$, $c_5$ and $c_6$ are being transmitted as in SDM with conjugates. The transmitted signals are received by the STBC decoding block 721, through receive antennas 720a, 720b and 720c. After processing, signals, $c_1$ and $c_2$, based on the originally transmitted signals are reformulated and output through outputs 751 and 752. In general, the received signals are related to the source signals through an "H" or "G" component plus a noise term.

From this set-up, the channels may be estimated as:

$$\begin{bmatrix} r_1 \\ r_2 \\ r_3 \end{bmatrix}_{6\times 1} = \begin{bmatrix} H_1 & G_1 \\ H_2 & G_2 \\ H_3 & G_3 \end{bmatrix}_{6\times 6} \begin{bmatrix} c_1 \\ c_2 \\ c_3 \end{bmatrix}_{6\times 1} + \begin{bmatrix} n_1 \\ n_2 \\ n_3 \end{bmatrix}_{6\times 1} \text{ where,}$$ (11)

$$c_1 = \begin{bmatrix} c_1(t_0) \\ c_2(t_0) \end{bmatrix}, c_2 = \begin{bmatrix} c_3(t_0) \\ c_4(t_0) \end{bmatrix}, c_3 = \begin{bmatrix} c_5(t_0) \\ c_6(t_0) \end{bmatrix},$$

$$r_1 = \begin{bmatrix} r_1(t_0) \\ r^*_1(t_1) \end{bmatrix}, r_2 = \begin{bmatrix} r_2(t_0) \\ r^*_2(t_1) \end{bmatrix}, r_3 \begin{bmatrix} r_3(t_0) \\ r^*_3(t_1) \end{bmatrix},$$

$$H_i = \begin{bmatrix} h_{1i} & h_{2i} \\ h^*_{2i} & -h^*_{1i} \end{bmatrix}, G_i = \begin{bmatrix} g_{1i} & 0 & g_{2i} & 0 \\ 0 & g^*_{1i} & 0 & g^*_{2i} \end{bmatrix}$$

To cancel the interference, zero forcing is applied such that:

$$\begin{bmatrix} \begin{bmatrix} 1 & 0 \\ 0 & 1 \end{bmatrix} & \begin{bmatrix} a_1 & 0 & a_2 & 0 \\ 0 & a^*_1 & 0 & a^*_2 \end{bmatrix} \end{bmatrix} \begin{bmatrix} z_{11} & z_{12} & z_{13} & z_{14} & z_{15} & z_{16} \\ z_{21} & z_{22} & z_{23} & z_{24} & z_{25} & z_{26} \\ z_{31} & z_{32} & z_{33} & z_{34} & z_{35} & z_{36} \\ z_{41} & z_{42} & z_{43} & z_{44} & z_{45} & z_{46} \end{bmatrix} \times$$ (12)

$$\begin{bmatrix} r_1 \\ r_2 \\ r_3 \end{bmatrix} = \begin{bmatrix} \tilde{r}_1 \\ \tilde{r}_2 \\ \tilde{r}_3 \end{bmatrix} = \begin{bmatrix} \tilde{H} & 0 \\ 0 & \tilde{G} \end{bmatrix}_{6\times 6} \times \begin{bmatrix} c_1 \\ c_2 \\ c_3 \end{bmatrix} + \begin{bmatrix} \tilde{n}_1 \\ \tilde{n}_2 \\ \tilde{n}_3 \end{bmatrix}$$

where, $$\tilde{H}_{2\times 2} = H_1 - \begin{bmatrix} a_1 & 0 & a_2 & 0 \\ 0 & a^*_1 & 0 & a^*_2 \end{bmatrix} \times \begin{bmatrix} H_2 \\ H_3 \end{bmatrix},$$

$$\tilde{G}_{4\times 4} = \begin{bmatrix} \sqrt{\sum_{i=1}^{3} |g_{1i}|^2} \times I_{2\times 2} & 0 \\ 0 & \sqrt{\sum_{i=1}^{3} |g_{2i}|^2} \times I_{2\times 2} \end{bmatrix},$$

Thereafter Z is found by zero-forcing to minimize noise enhancement, such that:

$z = (AA^*)^{-1} A^* c$ where, (13)

$$z = [z_{ij}]', c = [0_{2\times 4} \quad \tilde{G}_{4\times 4}]', A = \begin{bmatrix} H_1 & G_1 \\ H_2 & G_2 \\ H_3 & G_3 \end{bmatrix}'$$

and $a_1$ and $a_2$ are also found by zero forcing $$\begin{bmatrix} a_1 \\ a_2 \end{bmatrix} = \begin{bmatrix} g_{12} & g_{13} \\ g_{22} & g_{23} \end{bmatrix}^{-1} \times \begin{bmatrix} -g_{11} \\ -g_{21} \end{bmatrix}.$$

Next, STBC decoding may be performed with channel matching in processes similar to those discussed in the above-discussed embodiments. In all of the above discussed embodiments, at least a pair of transmit antennas are used for STBC ($c_1(t_0)$ and $c_2(t_0)$), the other transmit antennas may transmit SDM signals. Thus, while only the first two sequences, $c_1(t)$ and $c_2(t)$, will obtain diversity gain, but there may be additional coding gains based on good quality bits. The additional sequences provide signal-to-noise advantages using repetition codes.

Although the invention has been described based upon these preferred embodiments, it would be apparent to those skilled in the art that certain modifications, variations, and alternative constructions would be apparent, while remaining within the spirit and scope of the invention. In order to determine the metes and bounds of the invention, therefore, reference should be made to the appended claims.

What is claimed is:

1. A method of communicating data to M receiving antennas from N transmitting antennas, where M and N are integers, the method comprising:
   receiving M data signals from M receive antennas;
   applying the M data signals to a space/time decoder to produce M decoded streams; and
   reconstructing original data transmitted via N transmit antennas of the N transmitting antennas from the M decoded streams;
   wherein at least P transmitting antennas of the N transmitting antennas transmit space-time block-coded signals and (N-P) transmitting antennas transmit code signals through spatial division multiplexing, where P is an integer.

2. The method of claim 1, wherein reconstructing of original data comprises determining a number of transmit streams and configurations of those transmit streams through analysis of the M decoded streams.

3. The method of claim 1, wherein P comprises two and the receiving of M data signals comprises receiving two space-time block-coded signals.

4. The method of claim 3, wherein N comprises three and the receiving of M data signals comprises receiving a repetition code signal.

5. A method according to claim 1, wherein the reconstructing of original data comprises zero-forcing terms equivalent to relationships between signals sent from the N transmitting antennas to the M receiving antennas to cancel interference.

6. A method according to claim 5, wherein the relationships comprise:

$$\begin{bmatrix} r_1 \\ r_2 \end{bmatrix} = \begin{bmatrix} H_1 & G_1 \\ H_2 & G_2 \end{bmatrix} \begin{bmatrix} c_1 \\ c_2 \end{bmatrix} + \begin{bmatrix} n_1 \\ n_2 \end{bmatrix} \text{ where,}$$

$$c_1 = \begin{bmatrix} c_1(t_0) \\ c_1(t_1) \end{bmatrix}, c_2 = [c_2(t_0)], r_1 = \begin{bmatrix} r_1(t_1) \\ r_1^*(t_2) \end{bmatrix}, r_2 = \begin{bmatrix} r_2(t_1) \\ r_2^*(t_2) \end{bmatrix},$$

$$H_i = \begin{bmatrix} h_{1i} & h_{2i} \\ h_{2i}^* & -h_{1i}^* \end{bmatrix}, G_i = \begin{bmatrix} g_i \\ g_i^* \end{bmatrix},$$

where $r_i(t)$ and $c_i(t)$ are the received and transmitted signals, respectively, $n_i$ represent noise terms and $G_i$ and $H_i$ represent relationships between signals sent from three transmit antennas to two receive antennas.

7. A method according to claim 5, wherein the relationships comprise:

$$\begin{bmatrix} r_1 \\ r_2 \end{bmatrix}_{4\times1} = \begin{bmatrix} H_1 & G_1 \\ H_2 & G_2 \end{bmatrix}_{4\times4} \begin{bmatrix} c_1 \\ c_2 \end{bmatrix}_{4\times1} + \begin{bmatrix} n_1 \\ n_2 \end{bmatrix}_{4\times1} \text{ where,}$$

$$c_1 = \begin{bmatrix} c_1(t_0) \\ c_2(t_0) \end{bmatrix}, c_2 = \begin{bmatrix} c_3(t_0) \\ c_4(t_0) \end{bmatrix}, r_1 = \begin{bmatrix} r_1(t_0) \\ r_1^*(t_1) \end{bmatrix}, r_2 = \begin{bmatrix} r_2(t_0) \\ r_2^*(t_1) \end{bmatrix},$$

$$H_i = \begin{bmatrix} h_{1i} & h_{2i} \\ h_{2i}^* & -h_{1i}^* \end{bmatrix}, G_i = \begin{bmatrix} g_i & 0 \\ 0 & g_i^* \end{bmatrix}$$

where $r_i(t)$ and $c_i(t)$ are the received and transmitted signals, respectively, $n_i$ represent noise terms and $G_i$ and $H_i$ represent relationships between signals sent three transmit antennas to two receive antennas.

8. A method according to claim 5, wherein the relationships comprise:

$$\begin{bmatrix} r_1 \\ r_2 \\ r_3 \end{bmatrix}_{6\times1} = \begin{bmatrix} H_1 & G_1 \\ H_2 & G_2 \\ H_3 & G_3 \end{bmatrix}_{6\times6} \begin{bmatrix} c_1 \\ c_2 \\ c_3 \end{bmatrix}_{6\times1} + \begin{bmatrix} n_1 \\ n_2 \\ n_3 \end{bmatrix}_{6\times1} \text{ where,}$$

$$c_1 = \begin{bmatrix} c_1(t_0) \\ c_2(t_0) \end{bmatrix}, c_2 = \begin{bmatrix} c_3(t_0) \\ c_4(t_0) \end{bmatrix}, c_3 = \begin{bmatrix} c_5(t_0) \\ c_6(t_0) \end{bmatrix},$$

$$r_1 = \begin{bmatrix} r_1(t_0) \\ r_1^*(t_1) \end{bmatrix}, r_2 = \begin{bmatrix} r_2(t_0) \\ r_2^*(t_1) \end{bmatrix}, r_3 = \begin{bmatrix} r_3(t_0) \\ r_3^*(t_1) \end{bmatrix},$$

$$H_i = \begin{bmatrix} h_{1i} & h_{2i} \\ h_{2i}^* & -h_{1i}^* \end{bmatrix}, G_i = \begin{bmatrix} g_{1i} & 0 & g_{2i} & 0 \\ 0 & g_{1i}^* & 0 & g_{2i}^* \end{bmatrix}$$

where $r_i(t)$ and $c_i(t)$ are the received and transmitted signals, respectively, $n_i$ represent noise terms and $G_i$ and $H_i$ represent relationships between signals sent from four transmit antennas to three receive antennas.

9. A receiver for communicating data from N transmitting antennas to M receiving antennas, where M and N are integers, comprising:
   receiving means for receiving M data signals via M receive antennas;
   applying means for applying the M data signals to a space/time decoder to produce M decoded streams; and
   reconstructing means for reconstructing original data transmitted via N transmit antennas from the M decoded streams;
   wherein at least P transmitting antennas of the N transmitting antennas transmit space-time block-coded signals and (N-P) transmitting antennas of the N transmitting antennas transmit code signals through spatial division multiplexing, where P is an integer.

10. The reciever of claim 9, wherein the reconstructing means comprises determining means for determining a number of transmit streams and configurations of those transmit streams through analysis of the M decoded streams.

11. The receiver of claim 9, wherein P comprises two and the receiving means comprise means for receiving two space-time block-coded signals.

12. The receiver of claim 11, wherein N comprises three and the receiving means comprise means for receiving a repetition code signal.

13. A receiver according to claim 9, wherein the applying means further comprises zero-forcing means for zero-forcing terms equivalent to relationships between signals sent from the N transmitting antennas to the M receiving antennas to cancel interference.

14. A receiver according to claim 13, wherein the relationships comprise:

$$\begin{bmatrix} r_1 \\ r_2 \end{bmatrix} = \begin{bmatrix} H_1 & G_1 \\ H_2 & G_2 \end{bmatrix} \begin{bmatrix} c_1 \\ c_2 \end{bmatrix} + \begin{bmatrix} n_1 \\ n_2 \end{bmatrix} \text{ where,}$$

$$c_1 = \begin{bmatrix} c_1(t_0) \\ c_1(t_1) \end{bmatrix}, c_2 = [c_2(t_0)], r_1 = \begin{bmatrix} r_1(t_1) \\ r_1^*(t_2) \end{bmatrix}, r_2 = \begin{bmatrix} r_2(t_1) \\ r_2^*(t_2) \end{bmatrix},$$

$$H_i = \begin{bmatrix} h_{1i} & h_{2i} \\ h_{2i}^* & -h_{1i}^* \end{bmatrix}, G_i = \begin{bmatrix} g_i \\ g_i^* \end{bmatrix},$$

where $r_i(t)$ and $c_i(t)$ are the received and transmitted signals, respectively, $n_i$ represent noise terms and $G_i$ and $H_i$ represent relationships between signals sent from three transmit antennas to two receive antennas.

15. A receiver according to claim 13, wherein the relationships comprise:

$$\begin{bmatrix} r_1 \\ r_2 \end{bmatrix}_{4\times 1} = \begin{bmatrix} H_1 & G_1 \\ H_2 & G_2 \end{bmatrix}_{4\times 4} \begin{bmatrix} c_1 \\ c_2 \end{bmatrix}_{4\times 1} + \begin{bmatrix} n_1 \\ n_2 \end{bmatrix}_{4\times 1} \text{ where,}$$

$$c_1 = \begin{bmatrix} c_1(t_0) \\ c_2(t_0) \end{bmatrix}, c_2 = \begin{bmatrix} c_3(t_0) \\ c_4(t_0) \end{bmatrix}, r_1 = \begin{bmatrix} r_1(t_0) \\ r_1^*(t_1) \end{bmatrix}, r_2 = \begin{bmatrix} r_2(t_0) \\ r_2^*(t_1) \end{bmatrix},$$

$$H_i = \begin{bmatrix} h_{1i} & h_{2i} \\ h_{2i}^* & -h_{1i}^* \end{bmatrix}, G_i = \begin{bmatrix} g_i & 0 \\ 0 & g_i^* \end{bmatrix}$$

where $r_i(t)$ and $c_i(t)$ are the received and transmitted signals, respectively, $n_i$ represent noise terms and $G_i$ and $H_i$ represent relationships between signals sent three transmit antennas to two receive antennas.

16. A receiver according to claim 13, wherein the relationships comprise:

$$\begin{bmatrix} r_1 \\ r_2 \\ r_3 \end{bmatrix}_{6\times 1} = \begin{bmatrix} H_1 & G_1 \\ H_2 & G_2 \\ H_3 & G_3 \end{bmatrix}_{6\times 6} \begin{bmatrix} c_1 \\ c_2 \\ c_3 \end{bmatrix}_{6\times 1} + \begin{bmatrix} n_1 \\ n_2 \\ n_3 \end{bmatrix}_{6\times 1} \text{ where,}$$

$$c_1 = \begin{bmatrix} c_1(t_0) \\ c_2(t_0) \end{bmatrix}, c_2 = \begin{bmatrix} c_3(t_0) \\ c_4(t_0) \end{bmatrix}, c_3 = \begin{bmatrix} c_5(t_0) \\ c_6(t_0) \end{bmatrix},$$

$$r_1 = \begin{bmatrix} r_1(t_0) \\ r_1^*(t_1) \end{bmatrix}, r_2 = \begin{bmatrix} r_2(t_0) \\ r_2^*(t_1) \end{bmatrix}, r_3 = \begin{bmatrix} r_3(t_0) \\ r_3^*(t_1) \end{bmatrix},$$

$$H_i = \begin{bmatrix} h_{1i} & h_{2i} \\ h_{2i}^* & -h_{1i}^* \end{bmatrix}, G_i = \begin{bmatrix} g_{1i} & 0 & g_{2i} & 0 \\ 0 & g_{1i}^* & 0 & g_{2i}^* \end{bmatrix}$$

where $r_i(t)$ and $c_i(t)$ are the received and transmitted signals, respectively, $n_i$ represent noise terms and $G_i$ and $H_i$ represent relationships between signals sent from four transmit antennas to three receive antennas.

17. A receiver for communicating data from N transmitting antennas to M receiving antennas, where M and N are integers, comprising:

M receive antennas, for receiving M data signals;

a space/time decoder, configured to produce M decoded streams based on the M data signals; and symbol demapping modules, configured to reconstruct original data transmitted via N transmit antennas from the M decoded streams;

wherein at least P transmitting antennas of the N transmitting antennas transmit space-time block-coded signals and (N-P) transmitting antennas of the N transmitting antennas transmit code signals through spatial division multiplexing, where P is an integer.

18. The reciever of claim 17, wherein the space/time decoder is configured to determine a number of transmit streams and configurations of those transmit streams through analysis of the M decoded streams.

19. The receiver of claim 17, wherein P comprises two and the space/time decoder is configured to receive two space-time block-coded signals.

20. The receiver of claim 19, wherein N comprises three and the space/time decoder is configured to receive a repetition code signal.

21. A receiver according to claim 17, wherein the space/time decoder is configured to zero-force terms equivalent to relationships between signals sent from the N transmitting antennas to the M receiving antennas to cancel interference.

22. A receiver according to claim 21, wherein the relationships comprise:

$$\begin{bmatrix} r_1 \\ r_2 \end{bmatrix} = \begin{bmatrix} H_1 & G_1 \\ H_2 & G_2 \end{bmatrix} \begin{bmatrix} c_1 \\ c_2 \end{bmatrix} + \begin{bmatrix} n_1 \\ n_2 \end{bmatrix} \text{ where,}$$

$$c_1 = \begin{bmatrix} c_1(t_0) \\ c_1(t_1) \end{bmatrix}, c_2 = [c_2(t_0)], r_1 = \begin{bmatrix} r_1(t_1) \\ r_1^*(t_2) \end{bmatrix}, r_2 = \begin{bmatrix} r_2(t_1) \\ r_2^*(t_2) \end{bmatrix},$$

$$H_i = \begin{bmatrix} h_{1i} & h_{2i} \\ h_{2i}^* & -h_{1i}^* \end{bmatrix}, G_i = \begin{bmatrix} g_i \\ g_i^* \end{bmatrix},$$

where $r_i(t)$ and $c_i(t)$ are the received and transmitted signals, respectively, $n_i$ represent noise terms and $G_i$ and $H_i$ represent relationships between signals sent from three transmit antennas to two receive antennas.

23. A receiver according to claim 21, wherein the relationships comprise:

$$\begin{bmatrix} r_1 \\ r_2 \end{bmatrix}_{4\times 1} = \begin{bmatrix} H_1 & G_1 \\ H_2 & G_2 \end{bmatrix}_{4\times 4} \begin{bmatrix} c_1 \\ c_2 \end{bmatrix}_{4\times 1} + \begin{bmatrix} n_1 \\ n_2 \end{bmatrix}_{4\times 1} \text{ where,}$$

$$c_1 = \begin{bmatrix} c_1(t_0) \\ c_2(t_0) \end{bmatrix}, c_2 = \begin{bmatrix} c_3(t_0) \\ c_4(t_0) \end{bmatrix}, r_1 = \begin{bmatrix} r_1(t_0) \\ r_1^*(t_1) \end{bmatrix}, r_2 = \begin{bmatrix} r_2(t_0) \\ r_2^*(t_1) \end{bmatrix},$$

$$H_i = \begin{bmatrix} h_{1i} & h_{2i} \\ h_{2i}^* & -h_{1i}^* \end{bmatrix}, G_i = \begin{bmatrix} g_i & 0 \\ 0 & g_i^* \end{bmatrix}$$

where $r_i(t)$ and $c_i(t)$ are the received and transmitted signals, respectively, $n_i$ represent noise terms and $G_i$ and $H_i$ represent relationships between signals sent three transmit antennas to two receive antennas.

24. A receiver according to claim 21, wherein the relationships comprise:

$$\begin{bmatrix} r_1 \\ r_2 \\ r_3 \end{bmatrix}_{6\times 1} = \begin{bmatrix} H_1 & G_1 \\ H_2 & G_2 \\ H_3 & G_3 \end{bmatrix}_{6\times 6} \begin{bmatrix} c_1 \\ c_2 \\ c_3 \end{bmatrix}_{6\times 1} + \begin{bmatrix} n_1 \\ n_2 \\ n_3 \end{bmatrix}_{6\times 1} \text{ where,}$$

$$c_1 = \begin{bmatrix} c_1(t_0) \\ c_2(t_0) \end{bmatrix}, c_2 = \begin{bmatrix} c_3(t_0) \\ c_4(t_0) \end{bmatrix}, c_3 = \begin{bmatrix} c_5(t_0) \\ c_6(t_0) \end{bmatrix},$$

-continued $$r_1 = \begin{bmatrix} r_1(t_0) \\ r_1^*(t_1) \end{bmatrix}, r_2 = \begin{bmatrix} r_2(t_0) \\ r_2^*(t_1) \end{bmatrix}, r_3 = \begin{bmatrix} r_3(t_0) \\ r_3^*(t_1) \end{bmatrix},$$

$$H_i = \begin{bmatrix} h_{1i} & h_{2i} \\ h_{2i}^* & -h_{1i}^* \end{bmatrix}, G_i = \begin{bmatrix} g_{1i} & 0 & g_{2i} & 0 \\ 0 & g_{1i}^* & 0 & g_{2i}^* \end{bmatrix}$$

where $r_i(t)$ and $c_i(t)$ are the received and transmitted signals, respectively, $n_i$ represent noise terms and $G_i$ and $H_i$ represent relationships between signals sent from four transmit antennas to three receive antennas.

* * * * *